(12) United States Patent
Todd et al.

(10) Patent No.: US 6,381,919 B2
(45) Date of Patent: May 7, 2002

(54) MODULAR PACKAGING MACHINE WITH WEB TENSION CONTROL

(75) Inventors: James E. Todd; Thomas E. Brooker; Gregory A. Conn, all of Sarasota, FL (US)

(73) Assignee: Klockner-Bartelt, Inc., Sarasota, FL (US)

(*) Notice: Subject to any disclaimer, the term of this patent is extended or adjusted under 35 U.S.C. 154(b) by 0 days.

(21) Appl. No.: 09/809,553

(22) Filed: Mar. 15, 2001

Related U.S. Application Data

(62) Division of application No. 09/185,343, filed on Nov. 3, 1998.

(51) Int. Cl.[7] ............................................. B65B 57/04
(52) U.S. Cl. ............................................................ 53/64
(58) Field of Search ...................... 53/562, 568, 329.2, 53/51, 64, 389.2, 389.4

(56) References Cited

U.S. PATENT DOCUMENTS

| | | | |
|---|---|---|---|
| 2,950,588 A | | 8/1960 | Gausman ........................ 53/51 |
| 2,951,325 A | | 9/1960 | Podlesak et al. ............... 53/550 |
| 3,001,348 A | | 9/1961 | Rado ............................. 53/550 |
| 3,090,174 A | | 5/1963 | Kraft ............................. 53/450 |
| 3,513,629 A | | 5/1970 | Hoagland et al. ............. 53/550 |
| 3,553,934 A | | 1/1971 | Johnson et al. ............... 53/562 |
| 3,585,623 A | | 6/1971 | Laukaitis ...................... 53/550 |
| 3,640,051 A | | 2/1972 | Cloud, Jr. ..................... 53/550 |
| 3,738,081 A | | 6/1973 | Heinzer ........................ 53/550 |
| 3,759,432 A | * | 9/1973 | Hutzenlaub .................. 226/42 |
| 3,869,844 A | | 3/1975 | Edouard ....................... 53/557 |
| 3,975,888 A | | 8/1976 | Jones ............................ 53/386 |
| 3,995,791 A | * | 12/1976 | Schoppee .................. 242/58.1 |
| 4,009,551 A | | 3/1977 | Grenawalt et al. ............. 53/51 |
| 4,019,307 A | | 4/1977 | Ballestrazzi et al. .......... 53/553 |
| 4,109,792 A | * | 8/1978 | Greenawalt et al. ......... 206/525 |
| 4,201,031 A | | 5/1980 | Wiles ............................ 53/562 |
| 4,316,566 A | | 2/1982 | Arleth et al. ................... 53/51 |
| 4,436,576 A | | 3/1984 | Seiden ........................ 156/543 |
| 4,548,018 A | | 10/1985 | Wojnicki ...................... 53/51 |
| 4,580,473 A | | 4/1986 | Seiden et al. ................. 83/23 |
| 4,617,785 A | | 10/1986 | Chikatani et al. ............ 53/562 |
| 4,704,171 A | * | 11/1987 | Thompson et al. .......... 156/64 |
| 4,726,168 A | | 2/1988 | Seko .............................. 53/64 |
| 4,730,367 A | | 3/1988 | Vinokur ....................... 53/550 |
| 4,825,625 A | | 5/1989 | Hufford ...................... 493/197 |
| 4,849,040 A | | 7/1989 | Wood .......................... 156/204 |
| 4,999,968 A | | 3/1991 | Davis ........................ 53/133.1 |
| 5,058,364 A | | 10/1991 | Seiden et al. ................ 53/455 |
| 5,080,747 A | | 1/1992 | Veix ............................ 53/562 |
| 5,094,657 A | | 3/1992 | Dworak et al. ............ 493/208 |
| 5,181,365 A | | 1/1993 | Garvey et al. ............... 53/455 |
| 5,187,917 A | | 2/1993 | Mykleby ..................... 53/434 |
| 5,222,422 A | | 6/1993 | Benner, Jr. et al. ............ 83/37 |
| 5,315,807 A | | 5/1994 | Restle et al. ................... 53/51 |

(List continued on next page.)

FOREIGN PATENT DOCUMENTS

| | | | |
|---|---|---|---|
| CA | 2142480 | 8/1995 | ............ B65B/9/10 |
| EP | 89810699 | 4/1990 | ........... B65H/19/14 |
| EP | 89123703 | 7/1990 | ............. B65B/1/02 |
| SU | 519999 | 8/1977 | ................ 53/377 |

*Primary Examiner*—John Paradiso
(74) *Attorney, Agent, or Firm*—Leydig, Voit & Mayer, Ltd

(57) ABSTRACT

A packaging machine for forming pouches from a web of material having web tension control. A second pair of infeed rolls allows web tension through a sealing section to be controlled. An unwind reel is power-driven according to downstream web demand to thereby minimize tension spikes through the infeed section. The power unwind further minimizes the amount of festoon area needed. An entire packaging machine may be provided using modules. The registration-related operations of each section are independently controlled so that each module need only coordinate input and/or output speeds with interfacing sections.

15 Claims, 7 Drawing Sheets

U.S. PATENT DOCUMENTS

| | | | |
|---|---|---|---|
| 5,353,573 A | 10/1994 | Durrant | 53/410 |
| 5,359,832 A | 11/1994 | Hartman et al. | 53/562 |
| 5,533,322 A | 7/1996 | Bacon et al. | 53/450 |
| 5,699,653 A | 12/1997 | Hartman et al. | 53/455 |
| 5,722,217 A | 3/1998 | Cloud | 53/455 |
| 5,862,653 A | 1/1999 | Solano | 53/562 |
| 6,067,778 A * | 5/2000 | Yamamoto et al. | 53/451 |
| 6,079,188 A * | 6/2000 | Katayama et al. | 53/451 |

* cited by examiner

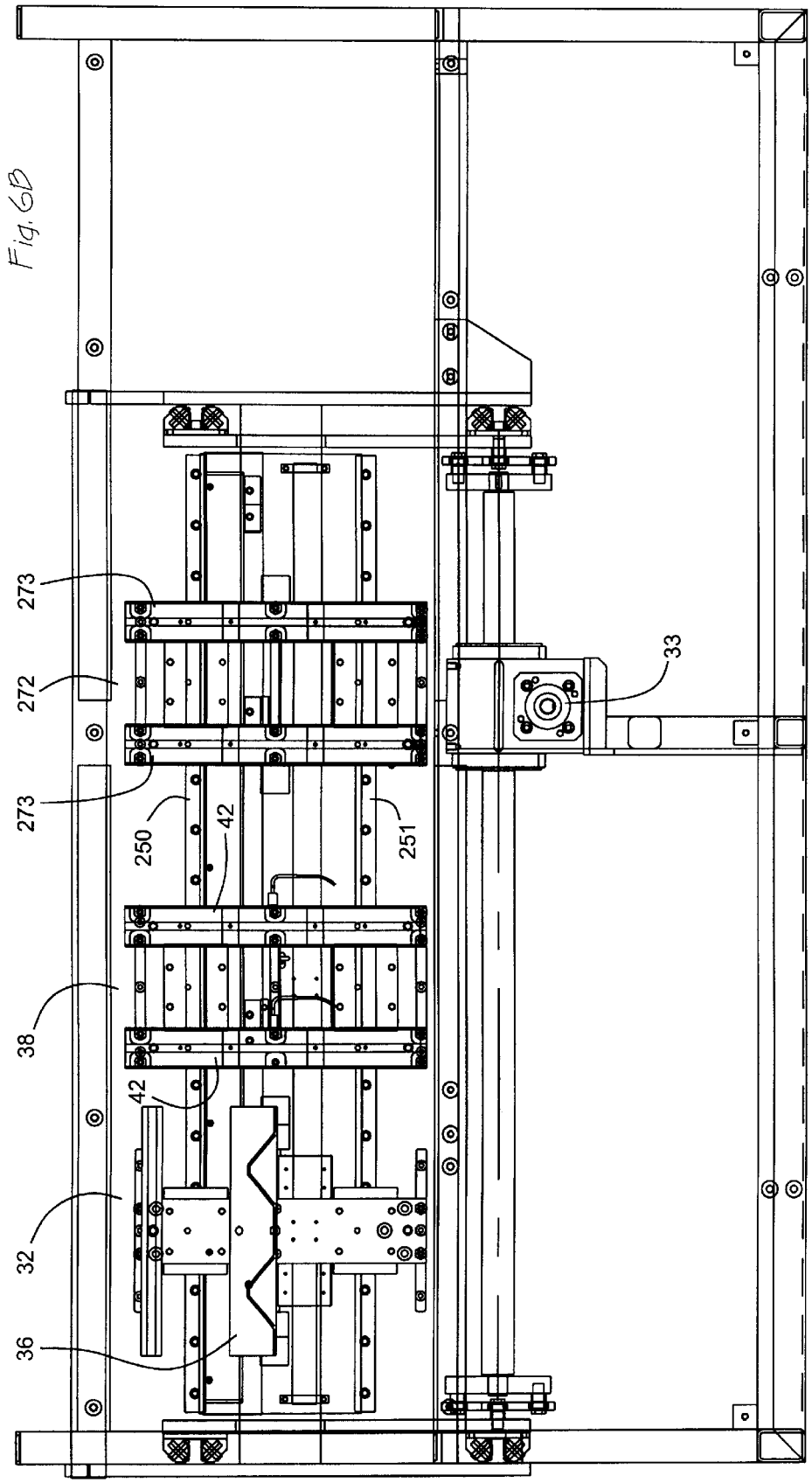

MODULAR PACKAGING MACHINE WITH WEB TENSION CONTROL

This is a divisional of U.S. application Ser. No. 09/185,343, filed on Nov. 3, 1998, which is incorporated by reference.

FIELD OF THE INVENTION

The present invention relates to packaging machines, and more particularly relates to horizontal form, fill, and seal packaging machines.

BACKGROUND OF THE INVENTION

Packaging machines are generally known in which a continuous web of material is converted into a plurality of individual pouches. The continuous web of material is folded in half over a plow to form two continuous side panels joined by a bottom fold. The folded web is passed through a series of seal bars which form transverse seals in between the side panels, thereby forming a strip of pouches interconnected by transverse seals. A cutter cuts through each transverse seal to form individual pouches with unsealed top edges. The individual pouches are transferred to a pouch filler, filled with product, and sealed. The sealed pouches are then collected for transport. Machines of this type may be categorized as either horizontal or vertical machines, depending on the general direction of web travel. The present invention relates to horizontal packaging machines in which the web travels horizontally.

The type and volume of product being packaged often determines whether the packaging process should use a continuously or intermittently advancing web. Certain products, such as hard candy, require a fill based on weight instead of volume. Scale fillers require relatively long period to fill a pouch. As a result, slower cycle continuous motion or intermittent motion is required to provide additional fill time. In addition, larger volume fills require more time, and therefore intermittent motion through the filler may be necessary. More free flowing products, such as sugar, may be dispensed using a diving funnel suitable for filling continuously advancing pouches.

In light of the above, packaging machines have been developed specifically for either intermittent or continuous operation. In intermittent motion machines, the web is intermittently advanced between dwell periods, and operations are performed on the web during the dwells. In a continuous web motion machine, on the other hand, the web continually moves at a set rate and each station for performing operations is phased with the web to perform the operation as the web passes through the station.

Most conventional packaging machines do not accurately form pouches out of weak or unsupported web materials. Conventional machines typically use a single pair of drive rolls to pull the web through the machine. As a result, weaker web materials stretch as they are pulled through the machine, thereby causing the pouch forming apparatus to be misaligned with the web. In addition, the web material must be sufficiently strong to withstand the force necessary to pull the web through the machine without breaking. These conventional packaging machines are therefore overly limited in the types of web material which may be run.

The problem of web stretch is exacerbated in conventional packaging machines using an intermittently advancing web. In intermittent operation, the web is repeatedly pulled and released as the web is advanced incrementally through the machine. The repeated pulls place a significant amount of strain on the web which tends to tear, break, or overly stretch weaker web materials.

A related problem with many conventional packaging machines is the need for an excessive amount of area in which to store a festoon of web material. Machines using intermittently advancing webs typically have a roll of web material which continually advances to reduce the stretch problems noted above. The continually advancing roll, however, requires storage space for excess web material during the dwells between incremental advances. Most machines having an intermittently advancing web therefore provide for a festoon area in which a buffer length of web material is stored. The conventional festoon sections typically employ a dancer roll which moves to accommodate the varying downstream web demand. The festoon sections are typically designed to store 4–5 repeat lengths of web material, thereby unduly extending the amount of floor space required for the machine.

Most conventional packaging machines further use a mechanical line shaft to drive the pouch forming components of the machine. As a result, extensive machining and retooling is often required to modify such machines to form different pouches. Furthermore, most or all of the machine is provided as an integral unit, with pouch forming operations running off of the mechanical drive line. As a result, individual components or groups of specific components may not be individually operated and tested.

SUMMARY OF THE INVENTION

A general aim of the present invention is to provide a packaging machine capable of running unsupported web material.

A related object of the present invention is to provide a packaging machine which minimizes the area required for a festoon section.

Another object of the present invention is to provide a packaging machine comprising modules which, when combined, provide a complete packaging machine.

A related object of the present invention as to provide separate pouch processing modules that may be independently operated and tested.

In light of the above, the present invention provides a packaging machine having improved web tension control. In addition to the driver rolls, the present invention incorporates a second pair of infeed rolls to pull the web through an infeed section of the machine. As a result, tension load on the web is divided into sections. The infeed and drive rolls are located on opposite sides of a sealing station. The speed of the infeed and drive rolls is controlled to produce a predetermined positive draw rate through the seal station, thereby controlling web tension therethrough.

In addition, the present invention reduces tension through the infeed section. The pouch material is provided as a wound roll that is unwound to dispense the web. A power driven reel unwinds the roll to thereby reduce tension in the web. A festoon is located between the reel and infeed rolls to supply a buffer of web material. The festoon has at least one translating roll which moves to accumulate or play out web material as needed. In the preferred embodiment, a sensor measures the location of the translating roll and delivers a location signal. A controller for controlling speed of the reel is responsive to the location signal to adjust the reel speed according to translating roll position. As a result, the translating roll indicates downstream demand which allows the reel motor to adjust accordingly, thereby relieving potential tension spikes through the web.

The variable speed motor on the unwind reel further minimizes the area required for the festoon. It will be appreciated that, in either continuous or intermittent modes, the web is advanced at an average speed through the sealing section. The reel motor is controlled to supply web at an average velocity matching that of the sealing section, thereby reducing the amount of festoon needed in the infeed section. The amount of festoon section required is further reduced by using the buffer sensor noted above so that the reel speed is further adjusted according to actual downstream demand. In intermittently advancing machines, it will be appreciated that the web roll is relatively heavy and therefore has too much inertia to stop and start the reel for each incremental advance. Accordingly, the reel speed follows a cycle in which the speed increases and decreases for each incremental web advance.

The present invention further provides a modular pouch forming machine. Each module is capable of interfacing with previous or subsequent sections as needed, and internal registration-related operations are performed independently. For example, a supply module has a pair or motor driven infeed rolls for supplying a folded web at a desired speed. A sealing module has a pair of drive rolls adapted to pull the web from the outlet of the supply module. The drive rolls are motor driven and controlled to thereby adjust the speed of the drive rolls. Downstream of the drive rolls is a cutter for separating individual pouches from the web. Finally, a filling module receives the individual pouches and carries them through a pouch filler. The pouches are carried in clamps, and a transfer device transports the pouches from the cutter to the clamps. Variable speed motors are drivingly connected to the transfer device in clamps to thereby adjust speed. When supplied together in a line, a controller coordinates the speeds of the motors in each of the modules so that the web and pouches are advanced at a constant rate. When supplied individually, the modules incorporate the appropriate drives for operating the motors which may be coupled to an outside controller for individual operation and testing.

These and other aims, objectives, and features of the invention will become more apparent from the following detailed description when taken in conjunction with the accompanying drawings.

Figure 1:
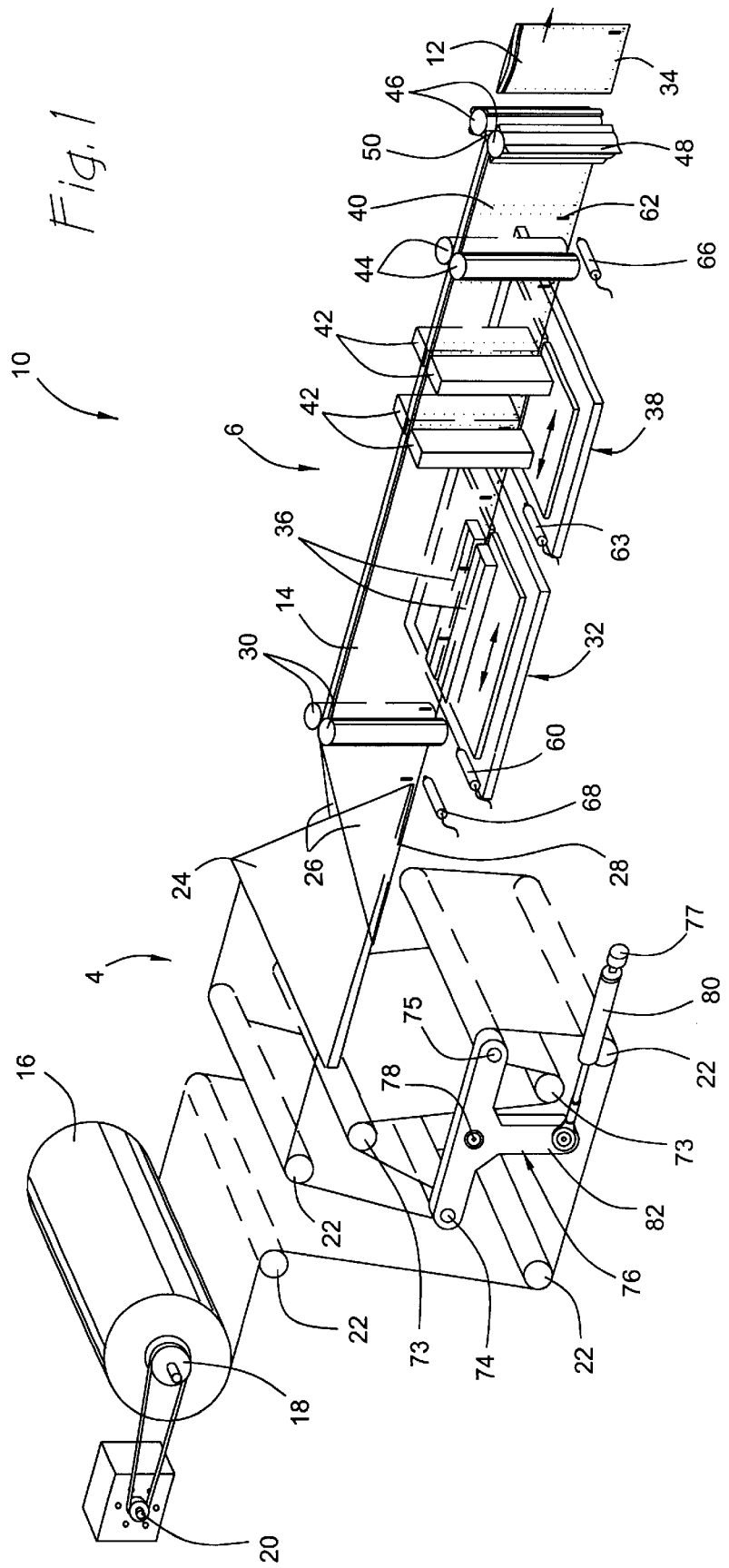
FIG. 1 is a schematic view in perspective of a packaging machine in accordance with the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, a packaging machine 10 is illustrated in FIG. 1. The packaging machine 10 produces pouches 12 from a continuous web 14 of material. The web 14 has pre-printed registration marks 62 at spaced intervals corresponding to the desired pouch width. The position of the registration marks with respect to the printed artwork is known on the web. The web is made of sealable material, which includes heat-sealable material (such as polyethylene or polypropylene) and pressure-sensitive cold seal film. The embodiments described below are directed mainly to a machine 10 running heat-sealable web material.

According to the embodiment illustrated in FIG. 1, the packaging machine has an infeed section 4 which supplies the folded web 14 to a sealing section 6. The planar web material is typically provided as a wound roll 16. The infeed section 4 has a reel 18 for supporting the roll 16. The reel 18 rotates to unwind the roll 16, thereby dispensing the web 14. The reel 18 may be conventionally controlled or, as described in greater detail below, may have a dedicated unwind motor 20 for varying an unwind speed. The web 14 is threaded over tension rollers 22 and a plow assembly 24 for folding the web to form side panels 26 joined at a common bottom edge 28. As illustrated in FIG. 1, the bottom edge 28 is formed with a V-shape. The plow assembly 24 may also include a gusset blade (not shown) for forming a W-shaped bottom edge. The folded web 10 is passed through a pair of infeed rolls 30 to cleanly define the fold lines in the web. In accordance with certain aspects of the present invention, the infeed rolls 30 may also pull the web through the first portion of the packaging machine, as described in greater detail below.

The web 14 next travels through a sealing portion of the machine 10 in which any of a number of pouch forming operations take place. In accordance with the embodiment illustrated in FIG. 1, the web 14 first passes through a bottom or first seal station 32 for forming a bottom seal 34, such as a delta seal, in the web 14. The web 14 next passes through a side seal station 38 which forms side seals 40 in the web. Upon leaving the side seal station 38, the web 14 is formed as a strip of pouches interconnected at the side seals 40. The seal stations 32, 38 may use heated seal bars to form seals in heat-sealable web material, or may use unheated seal bars when the web material is a cold seal film. If heated, the seal bars have a heating element such as a heat tube extending therethrough. The heat tube is preferably electrically operated and controlled to provide a desired sealing temperature at the surface of the seal bar.

Figure 6A:
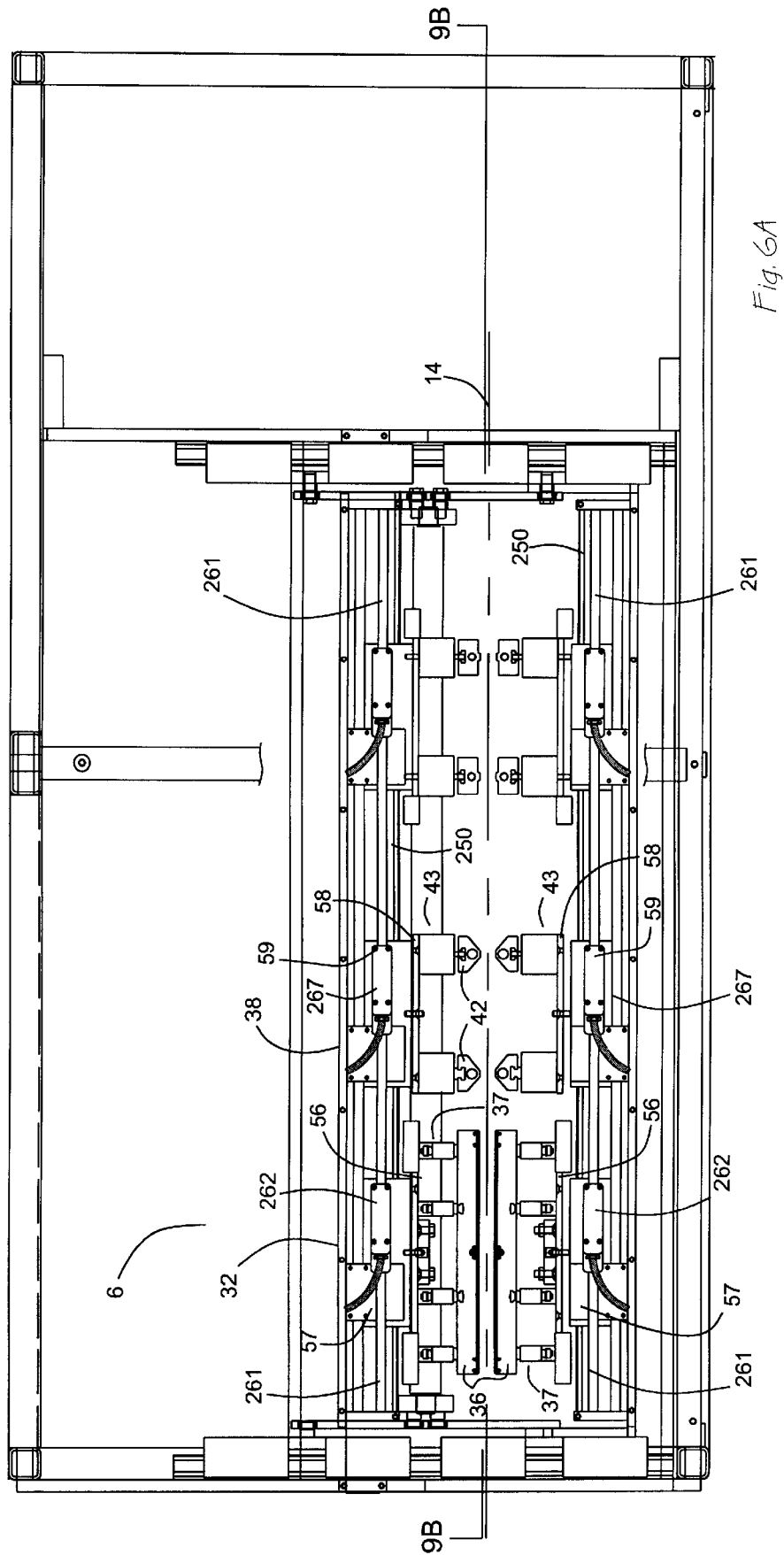
FIGS. 6A and B are enlarged top and side views of the currently preferred seal section.

The seal stations 32, 38 are operable to form seals in the web 14 as the web advances. In the currently preferred embodiment illustrated in FIGS. 6A and B, the bottom seal station, for example, has a pair of opposing bottom seal bars 36. A sub-support 37 is attached to the rear of each bottom seal bar 36, and each sub-support 37, in turn, is attached to a carriage 56. Each carriage 56 is adapted, such as by bearing sets, to slide along upper and lower tracks 250, 251 which extend along the length of the sealing section, as best shown in FIG. 6B. The sliding carriages 56 allow the bottom seal bars to translate back and forth parallel to the web path, defined herein as longitudinal motion.

The bottom seal bars 36 are further operable in a direction perpendicular to the web path, defined herein as lateral motion. The tracks 250, 251 are attached to end supports slidably mounted on rails 256, 257 extending perpendicular to the web path (FIG. 6B). As a result, the upper and lower tracks 250, 251 are operable in the lateral direction to reciprocate the bottom seal bars 36 into and out of engagement with the web path.

The side seal station 38 has a structure similar to that of the bottom seal station 32. As best shown in FIG. 6A, the side seal station comprises two pairs of opposing side bars 42. Sub-supports 43 are attached to the seal bars 42. The sub-supports 43, in turn, are attached to carriages 58 mounted for translation along the upper and lower tracks 250, 251. As a result, the side seal bars 42 are also operable in both longitudinal and lateral directions.

Figure 4A:
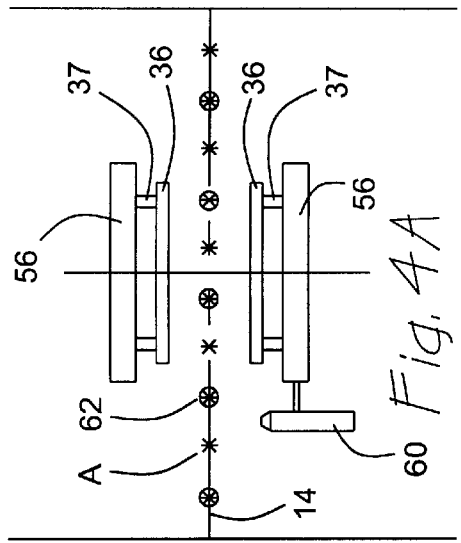
FIGS. 4A–F are schematic top views of a seal station performing a box motion.
Figure 4B:
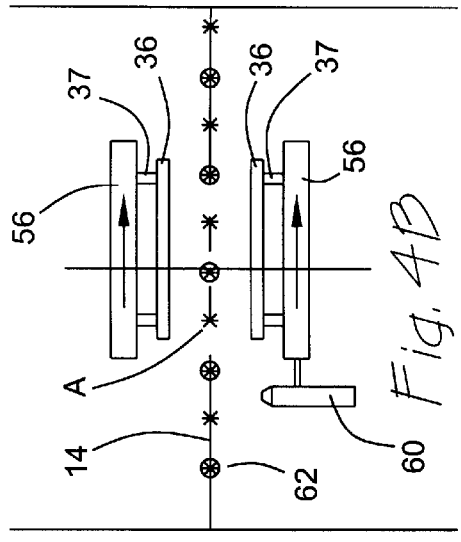
Figure 4C:
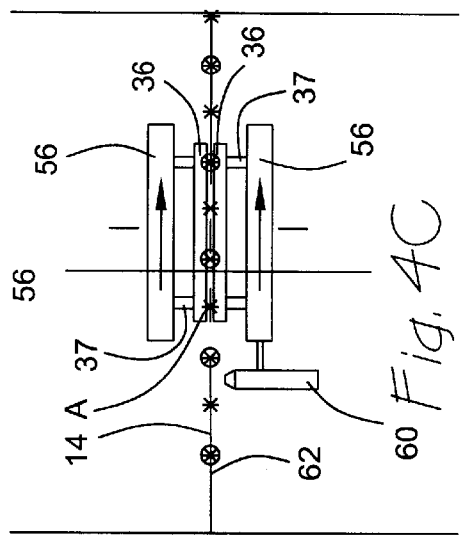
Figure 4D:
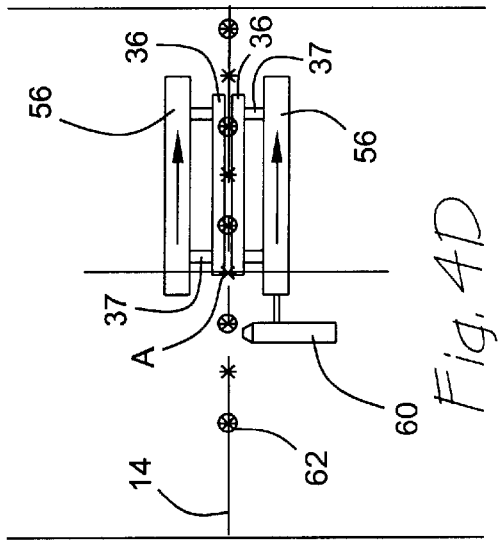
Figure 4E:
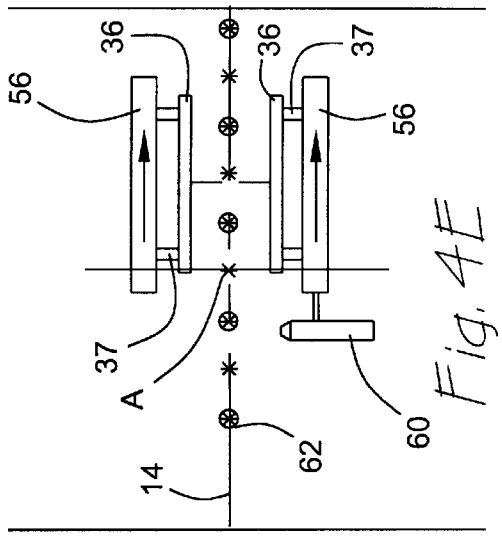
Figure 4F:
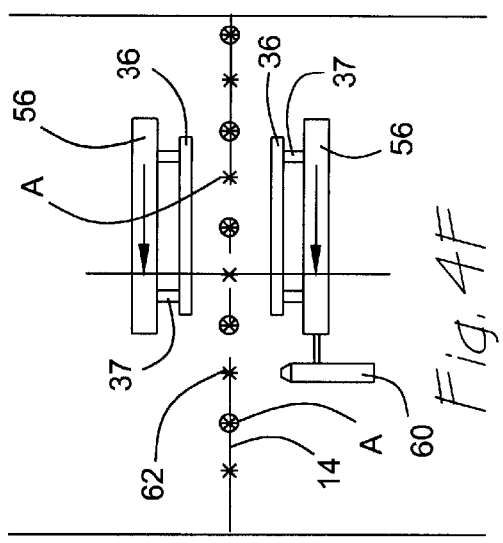

The combination of the laterally moving sub-supports 37 and the longitudinally translating carriages 56 allows the seal bars to be driven in a box motion. As best shown in FIG. 4A, the bottom seal bars 36 begin in an initial position, in which the bars are retracted from the web and the carriages 56 are at an upstream position. From the initial position, the carriages 56 are driven downstream at a same speed as the web, as shown in FIG. 4B. With the carriages 56 still moving downstream, the sub-supports 37 are driven laterally inwardly so that the seal bars 36 engage the web 14 (FIG. 4C). The bottom seal bars 36 are held in the inward position for a period of time sufficient to form a bottom seal as the carriages 56 continues to advance with the web 14 (FIG. 4D). After the bottom seal 34 is formed, the seal bars 36 are retracted and the carriages 56 reverse direction so that the web 14 advances downstream relative to the seal bars 36 (FIG. 4E). With the bottom seal bars 36 retracted, the carriages 56 moves longitudinally upstream toward the initial position (FIG. 4F). The bottom seal station 32 then repeats the above-described box motion to form subsequent bottom seals 34. The side seal station 38 is operated in a similar fashion.

In the above embodiment, the sealing stations 32, 38 operate in a duplex mode, in which the web 14 advances two web widths between each actuation of the seal bars. Accordingly, the bottom seal bars 36 are two pouch widths wide to simultaneously form two bottom seals 34. Similarly, the side seal station 38 carries two pairs of side seal bars 42. The machine 10 may also be operated in a simplex mode, whereby the web 14 is advanced a single pouch width between each actuation. In simplex mode, the bottom seal bars 36 are only one pouch width wide, and the side seal station 38 has a single pair of side seal bars 42.

In the preferred embodiment, variable speed motors are used to operate the bottom and side seal stations 32, 38 in the box motion. With respect to the bottom seal station 32, a variable speed motor 57 is coupled to each carriage 56 for driving the carriages longitudinally (FIGS. 6A and B). The motor 57 is preferably a linear motor having a magnetic rod 261 extending along the length of the sealing section 6. A motor housing 262 is mounted on the carriage 56 and operates back and forth along the rod 261. As a result, movement of the housing 262 along the rod 261 directly drives the attached carriage 56 longitudinally along the upper and lower tracks 250, 251. Motors 59 also drive the side seal carriages 58. The motors are preferably linear motors having housings 267 mounted on the same magnetic rods 261.

The lateral motion of the bottom and side seal bars 36, 42 is also preferably motor driven. A variable speed motor 33 is mechanically linked to the tracks 250, 251 to laterally reciprocate the tracks, thereby driving the seal bars 36, 42 into and out of engagement with the web 14 (FIG. 6B).

While the embodiment illustrated in FIGS. 6A and B is currently preferred, it will be appreciated that other arrangements may be used in accordance with the present invention, as long as the seal bars 36 are operable to translate in the longitudinal and lateral directions. For example, as schematically illustrated in FIG. 1, a single carriage mounted under the web may support seal bars on both sides of the web. In such an embodiment, however, a second motor must be supplied for each carriage to drive the lateral motion of the seal bars.

The seal bars are operated to engage the web as the web advances for both continuous and intermittent web motion. It will be appreciated that for intermittent web motion, the machine 10 of the present invention could be operated so that the seal bars engage the web during dwells, as is conventional. In the currently preferred embodiment, however, the seal bars always contact the web as the web advances, regardless of whether the web is advancing continuously or intermittently. By operating the seal stations in this manner, the seal bars will always be in contact with the web for a sufficient period of time to form the seals regardless of the dwell time between each intermittent advance of the web. Furthermore, the machine operates in a similar fashion for both continuous and intermittent web motion, thereby simplifying the controls and providing a machine which operates in a consistent manner.

According to the embodiment illustrated in FIG. 6A, the sealing section further comprises a cooling station 272. The cooling station 272 has cooling bars 273 carried by sub-supports 274. Carriages 275 carry the sub-supports 274 and are mounted on the upper and lower tracks 250, 251. Accordingly, the cooling station 272 is operated in the box motion similar to the bottom and side seal bars 36, 42. The cooling bars, however, are kept at a cool temperature in contrast to the heated seal bars. The cooling bars 273 set the side seals in the web so that the side seals 40 are stronger and do not stretch as the web 14 is pulled through the machine 10. The sealing section may further include additional mechanisms for notching, punching, and emboss coding the web. These additional components are located downstream of the cooling station.

Figure 3:
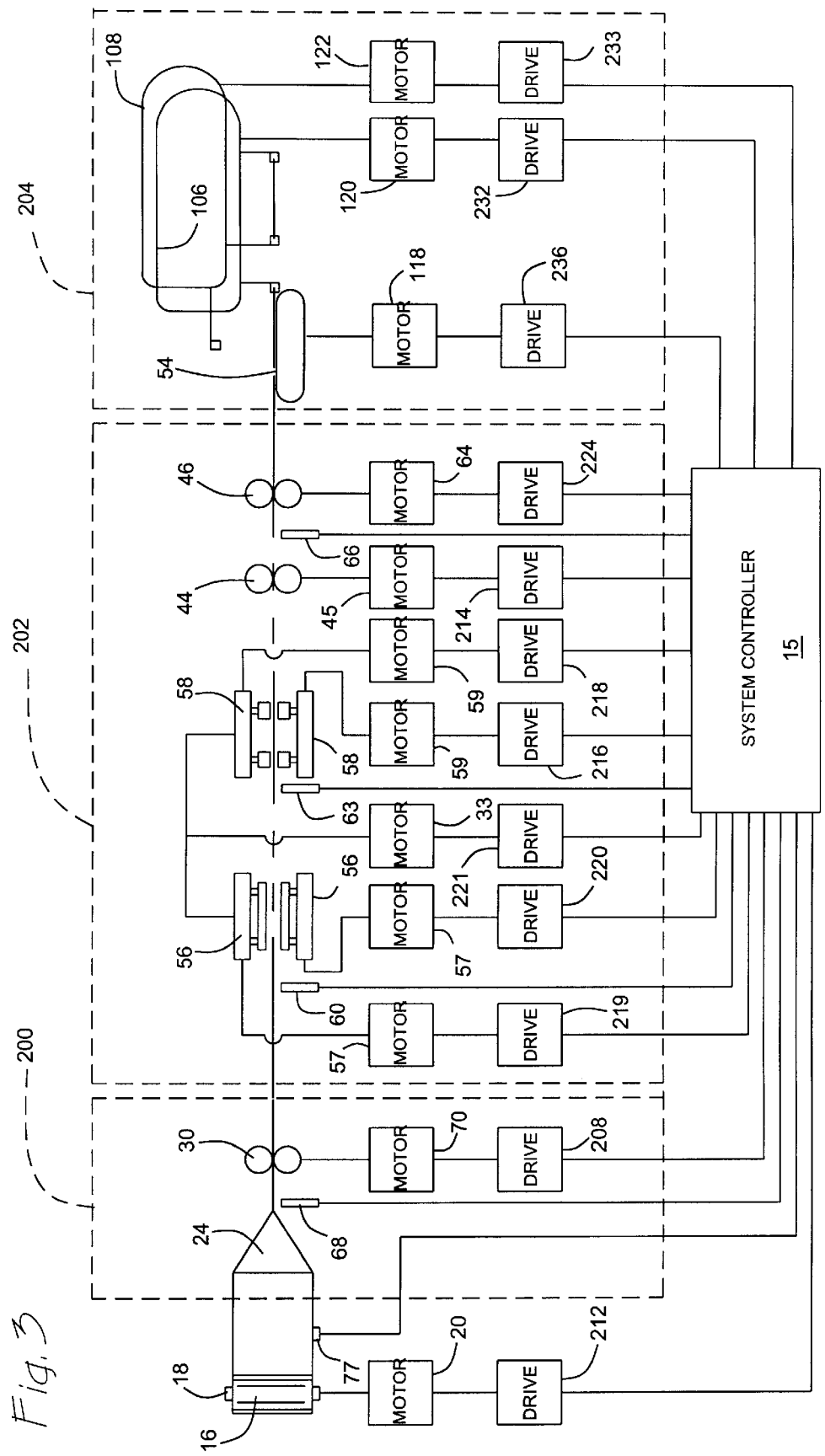
FIG. 3 is a block diagram of the controls of the packaging machine of FIGS. 1 and 2.

A pair of drive rolls 44 are located downstream of the seal stations to pull the web through the sealing section of the machine 10 (FIG. 1). The drive rolls 44 are positioned to pinch the web 14, thereby frictionally advancing the web. In accordance with certain aspects of the present invention, the drive rolls are operable both continuously and intermittently. In the preferred embodiment, a variable speed motor, such as drive roll servomotor 45, is coupled to and operates the drive rolls (FIG. 3).

A cutter is positioned immediately downstream of the drive rolls 44 (FIG. 1). According to the present invention, the cutter is adapted to cut the web at the formed side seals as the web advances. In the currently preferred embodiment, the cutter comprises a pair of cutter rolls 46, a first roll having a plurality of circumferentially spaced blades 48 and a second roll having a plurality of similarly spaced cutting surfaces 50. The cutter rolls 46 are mounted for rotation so that a blade 48 contacts the web 14 at the same time as an associated cutting surface 50 to thereby sever a leading pouch 12 from the web. In the preferred embodiment, a variable speed motor 64 operates the cutter rolls 46 (FIG. 3). Each pouch severed by the cutter rolls 46 is then transferred to a pouch filling section 8 by a transfer mechanism 54, as described in greater detail below.

In the preferred embodiment, the above-described sealing and cutting mechanisms are operated with an adjustable dwell period between subsequent operations. A system controller 15 is programmed to adjust the dwell of the components to thereby adapt the machine 10 for different operating parameters. In the preferred embodiment, the machine 10 uses electronic line shafting to synchronize the motor-driven components. An oscillator generates a pulse stream and is connected to a microprocessor in the system controller 15. The pulse stream corresponds to the web speed such that a given web speed has a corresponding pulse rate. The pulse rate is adjusted proportionally to web speed. As a result, the distance the web advances between pulses is always constant, and components may be placed at locations downstream of a fixed point on the machine which correspond to certain pulse counts. Web speed is defined herein as the instantaneous rate of travel of the web 14 as it advances. Under this definition, web dwell time during intermittent motion is not used to compute the instantaneous web speed.

According to the illustrated embodiment, the machine 10 has an infeed sensor 68 located at a registration point for sensing the registration marks 62 and generating a sync signal as each registration mark passes. The sync signals inform the system that the web is positioned in the machine 10 with a registration mark 62 at the registration point. With a defined registration point, therefore, components may be positioned at known distances downstream of that point and controlled to actuate a determined number of pulses after the registration signal. For example, the first seal station 32 may be positioned 2 feet downstream of the registration point, which may correspond to 1,000 pulses. The system controller 15 may then control the seal station to actuate after 1,000 pulses are counted from the sync signal. The pulse rate is generated such that, for this example, 1,000 pulses correspond to 2 feet of web travel for any web speed.

As noted above, a sync signal indicates that a registration mark 62 is passing the sensor 68. The registration marks 62 are longitudinally spaced at pouch width intervals along the web 14 so that consecutive sync signals indicate that the web has advanced one pouch width, defined herein as a cycle. In the most preferred embodiment, therefore, the web-engaging components are positioned downstream of the infeed at pouch width intervals. As a result, the components are controlled to operate with reference to each sync signal.

The pulse stream allows the machine 10 to be quickly and easily adapted to form pouches of various sizes. As noted above, the components of the machine may be positioned at pouch width intervals. If the pouch width is changed, the position of the components must also be adjusted for the new web width. Using the example presented above, the first seal station 32 may be repositioned 1 foot downstream of the registration point rather than 2 feet. The microprocessor of the system controller 15 may be programmed so that, for the new position, the first seal station 32 is actuated after 500 pulses are counted from the sync signal thereby adjusting the dwell period of the first seal station. The servomotors 57, 59 of the carriages 56, 58 allow the first and second seal stations 32, 38 to be quickly and easily repositioned for the new pouch width. Furthermore, the system controls are programmed to modify the dwell periods between component operations. Accordingly, the pouch making machine 10 of the present invention is quickly and easily adapted for various pouch sizes.

The above-described box motion of the seal stations 32, 38 is also preferably timed using the pulse stream. Accordingly, the carriages 56 of the bottom seal station 32 are controllably positioned a known distance downstream of the infeed sensor 68. As diagrammatically illustrated in FIG. 3, the system controller 15 controls drives 219, 220 to generate a drive signal to the carriage motors 57 to move the carriages 56 downstream at a speed equal to the web speed after a predetermined pulse count. As the carriages 56 move, the system controller 15 signals the reciprocating motor 33 through drive 221 to actuate the bottom seal bars 36 laterally inward after a predetermined number of pulses have elapsed after each sync signal. The motor 33 holds the bottom seal bars 36 in the inward position for another predetermined number of pulses corresponding to a sufficient period of time to form a seal in the web. Once the seal is formed, the bottom seal bars are retracted and the carriages 56 are driven upstream to the initial position. The same procedure is followed after each sync signal. The side seal station is operated in the same fashion. While the use of a pulse stream is preferred, it will be appreciated that other types of controls may be used to actuate the seal stations, such as the use of optical sensors which provide a feedback signal to initiate actuation of the components.

In the preferred embodiment, the drive roll servomotor 45 is also controlled by the system controller 15 using the pulse stream. The user selects a desired web speed and a pulse rate corresponding to that web speed is generated. The system controller 15 delivers a drive signal through drive 214 to the drive roll motor 45 to operate the drive rolls at the appropriate speed (FIG. 3).

In the preferred embodiment, the seal stations 32, 38 are provided with automatic registration to the web 14. To accomplish registration, a sensor is coupled to the carriage motors of each seal station. The sensor senses the registration marks 62 and delivers a seal registration signal. The bottom seal station 32, for example, carries a bottom seal sensor 60, as shown in FIGS. 1 and 3. The controller 15 receives the signal and drives the carriage motors 57 to position the carriages 56 relative to the registration mark 62 so that the bottom seal bars 36 are positioned over appropriate seal points on the web. As a result, the bottom seal station 32 is continually and automatically registered with the web 14. Any carriage position adjustments required for registration are compensated for by the microprocessor in the system controller 15, so that the box motion is executed in registration with the web 14. The side seal station 38 has a side seal sensor 63 for effecting similar registration. As shown in FIG. 3, the carriage motors 59 have drives 216, 218 coupled to the system controller 15. The sensor 63 delivers a location signal to the controller 15 which, in turn, adjusts the drive signals sent to the motors 59.

In the preferred embodiment, the cutter rolls 46 are also independently controlled to register with the web 14. A cutter sensor 66 is mounted a fixed distance upstream of the cutter rolls 46 for sensing the registration marks 62 and delivering a cut signal. The system controller 15 signals a drive 224 in response to the cut signal to control the speed of the cutter motor 64 so that the cutting rolls 46 cut through each side seal 40 (FIG. 3). Because the distance between the cutter sensor 66 and the cutter rolls 46 is known, the cutter servomotor 64 may be programmed to dwell for a given number of pulses upon receiving the cut signal before actuating the cutter rolls 46.

In a preferred embodiment, the infeed rolls 30 are controlled to provide a registered web to the sealing section. The infeed rolls 30 are driven by an infeed servomotor 70. The infeed sensor 68 is located immediately upstream of the infeed rolls 30 and senses the registration marks 62, as noted above. The system controller 15 compares the sync signals from the infeed sensor 68 with the desired web speed and adjusts a drive signal provided by drive 208 to the infeed servomotor 70 (FIG. 3). In intermittent mode, the infeed servomotor 70 is controlled so that the web 14 is advanced past the infeed rolls 30 by a predetermined distance. In continuous mode, the infeed rolls 30 are controlled so that the actual web speed, as measured by the infeed registration signals, matches the desired web speed. In either mode, operation of the infeed rolls is adjusted so that a registered web is supplied to the sealing section.

The infeed rolls 30 provide a second point at which the web 14 is pulled through the machine 10. The infeed rolls 30 engage the web 14 at a point upstream of the sealing section 6 to pull the web through the infeed section. As a result, the amount of web stretch through the sealing section is minimized, thereby improving the accuracy of the machine.

The infeed rolls 30 and drive rolls 44 are controlled to maintain a desired web tension level through the sealing section 6. An infeed servomotor 70 is drivingly connected to the infeed rolls 30. The controller 15 controls the drive roll and infeed servo motors 45, 70 to maintain a predetermined positive draw rate through the seal station. The positive draw may be established by either inputting a drive roll speed and setting the infeed roll speed relatively slower or by inputting the infeed roll speed and driving the drive rolls at a relatively faster speed. In either event, a controlled tension level is established through the sealing section 6. The only stretch load on the web 14 is that created by the positive draw and therefore the tension level may be controlled to run relatively weak web materials.

In accordance with certain aspects of the present invention, the unwind reel 18 is power-driven to reduce tension spikes in the web 14. The reel motor 20 has a drive 212 coupled to the system controller 15. As a result, the controller adjusts reel motor speed according to downstream demand. For example, in intermittent mode, the web 14 is advanced through the seal section 6 at an average speed in between pauses. The reel 18 is controlled to operate at an average speed which matches that of the seal section 6. The roll 16 is relatively heavy, and therefore has too much inertia to stop and start the roll in accordance with the web. The system controller 15 therefore drives the reel motor 20 in a controlled cycle in which the reel motor speed is increased and decreased for each intermittent increment of web travel. In continuous mode, the reel motor 20 is driven at a more consistent speed. In either mode, the reel motor 20 unwinds the roll 16 to thereby reduce tension in the web.

Figure 5A:
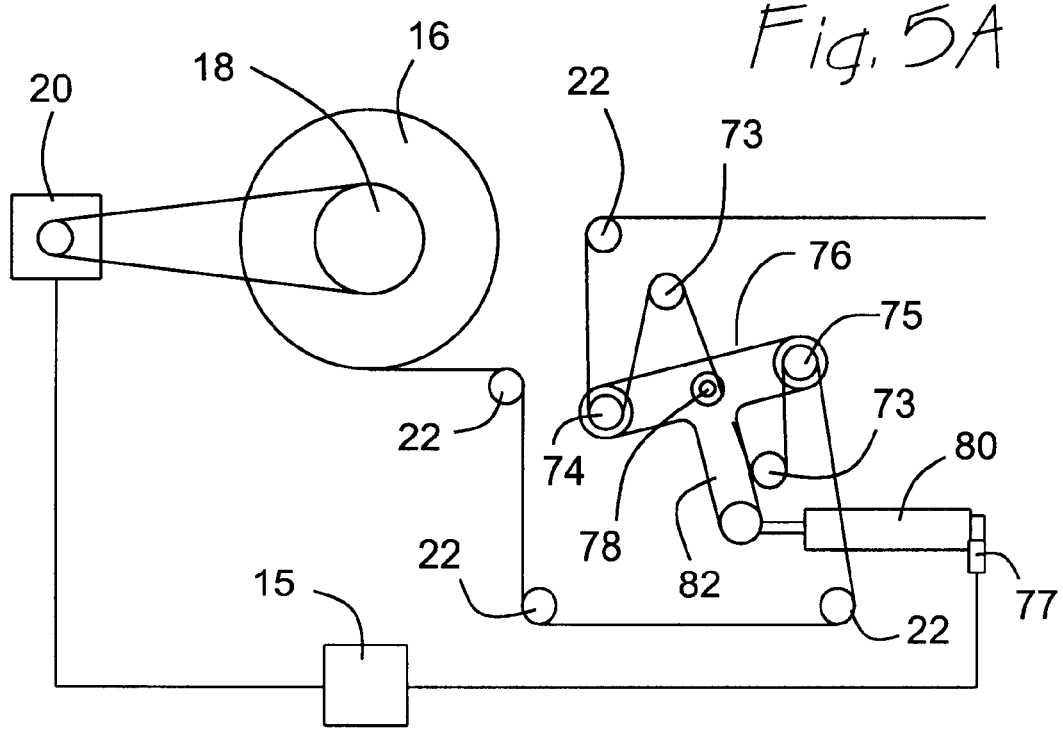
FIGS. 5A and B are schematic side views of the unwind, accumulator, and related controls.

Speed of the unwind reel 18 is further adjusted through the use of an accumulator 76. As best shown in FIGS. 5A and B, the t-shaped accumulator 76 is located in the infeed section 4 comprising translating rolls 74, 75. The accumulator 76 is fixed to pivot about a point 78. Fixed rolls 73 are also positioned near the accumulator 76. When the web 14 is threaded over the rolls, it will be appreciated that the accumulator 76 stores a buffer length of web material. A device for providing a known force, such as an air cylinder 80 is connected to a bottom arm 82 of the accumulator 76. Accordingly, it will be appreciated that as the accumulator 76 rotates counter-clockwise as illustrated in FIG. 5A, side roll 74 translates downward while side roll 75 translates upward, and bottom arm 82 moves to retract the air cylinder 80. Clockwise rotation of the accumulator 76, as shown in FIG. 5B, causes the side arm 74 to translate upward and the side arm 75 to translate downward, while the bottom arm 82 extends the air cylinder 80.

When the web 14 is entrained around the fixed and translating rolls as shown in FIGS. 5A and B, the direction of rotation of the accumulator 76 corresponds to downstream web demand. In FIG. 5A, downstream web demand has decreased causing the accumulator 76 to rotate counter-clockwise. The side rolls 74, 75 translate to accumulate slack web length in the buffer. In addition, the air cylinder 70 is retracted. A sensor 77 measures the position of the air cylinder 80 (and therefore the position of the side rolls 74, 75) and delivers a position signal to the controller 15. In response to the signal, the controller 15 decreases speed of the reel motor 20.

Figure 5B:
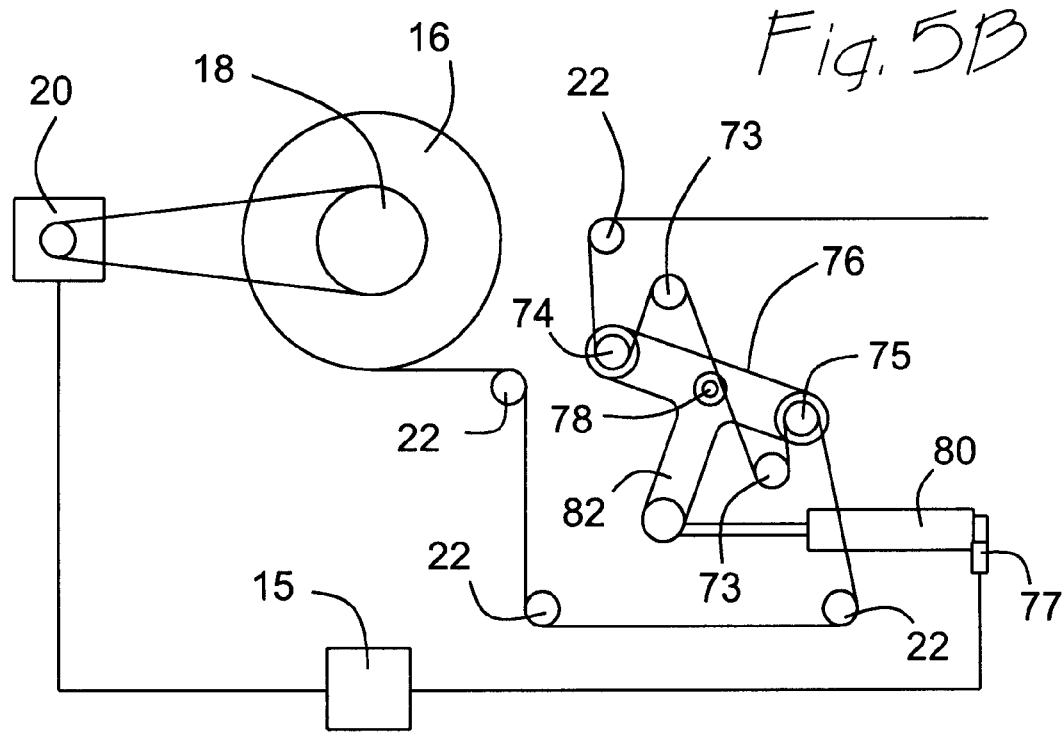

FIG. 5B illustrates the opposite situation, wherein downstream web demand has increased, thereby causing the accumulator 76 to rotate clockwise. Side rolls 74, 75 translate to play out spare web length from the buffer to meet the increased demand. The air cylinder 80 extends and the sensor 77 provides a position signal to a controller 79. In response, the controller 79 increases speed of the reel motor 20 to meet the increased demand. The buffer length of web material thereby accommodates variations in downstream web demand. Furthermore, the position of the accumulator is used to indicate downstream web demand, thereby allowing reel motor speed to be adjusted accordingly. As a result, tension spikes are minimized through the infeed section.

In accordance with additional aspects of the present invention, the above-described unwind reel control minimizes the amount of festoon area needed in the infeed section 4. As noted above, the reel motor 20 is controlled to adjust speed according to downstream demand. As a result, the amount of spare web material needed to be stored in a festoon is minimized. The reduced festoon, in turn, reduces the amount of floor space needed for the machine.

Figure 2:
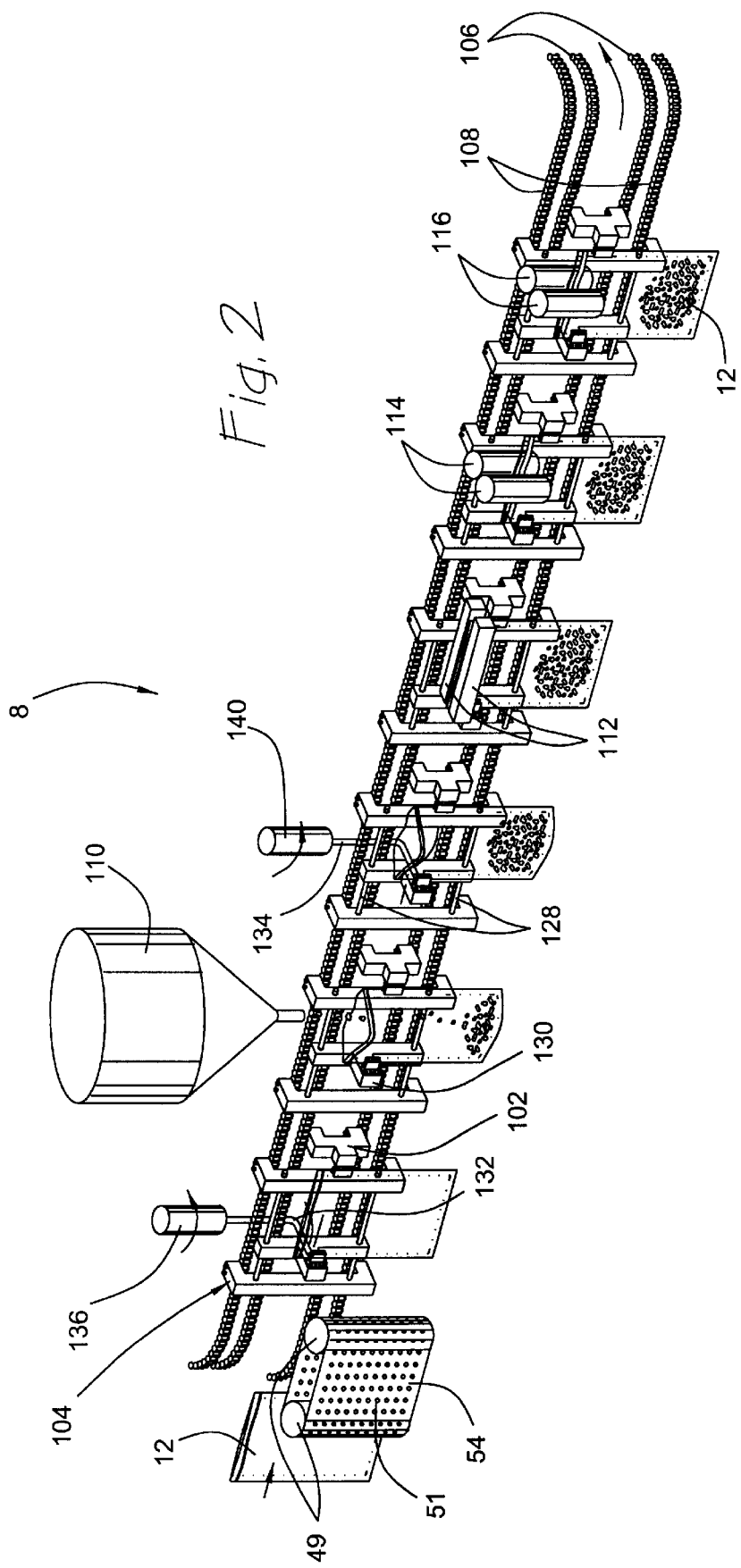
FIG. 2 is an enlarged perspective view of a pouch filler section for use with the packaging machine of FIG. 1.

The machine 10 further incorporates a pouch filling section for filling and sealing the formed pouches. At the outlet of the sealing section, the transfer mechanism 54 carries severed pouches from the cutter rolls 46 to leading and trailing clamps 102, 104 of the filler section. The clamps are carried on first and second endless carriers, illustrated in FIG. 2 as first and second chain sets 106, 108. It will be appreciated that other types of endless carriers, such as timing belts or metal bands, may also be used in accordance with the present invention. Furthermore, each endless carriers may comprise a single member, or a set of multiple members, FIG. 2 illustrating the latter by showing first and second chain sets 106, 108 comprising a pair of chains. The clamps are carried along a path which leads through a pouch filler 110. Once filled, the top edges of the pouches pass through radiant heater bars 112 which soften the pouch material. The pouches 12 with softened upper edges are then fed through a pair of upper seal rolls 114 to form an upper seal. The pouches then pass through a pair of cool rolls 116 to set the upper seal, after which each pouch 12 is picked off and transported from the filler section.

In the preferred embodiment, a variable speed motor 118 operates the transfer mechanism 54 to transfer each severed pouch 12 from the cutter rolls 46 to the clamps 102, 104 (FIG. 3). The transfer motor 118 has an associated drive 236 for providing a variable drive signal and is coupled to the system controller 15. It will be appreciated that, because of spacing between the clamps, the clamps are operated at a clamp speed greater than the web speed. The transfer mechanism 54, accordingly, is driven at a transfer speed which is slightly greater than the clamp speed. When first gripping a pouch, the transfer mechanism slides against the surface of the pouch until the pouch is severed from the web. Similarly, the transfer mechanism slides against the pouch until the pouch is carried away.

In the preferred embodiment, the transfer mechanism 54 provides a registration buffer between the sealing and pouch filling sections. The transfer speed of the transfer mechanism 54 may be independently controlled so that the components of the sealing section need not operate in registration with the clamps 102, 104 of the pouch filling section. As a result, the sealing and pouch filling section may be independently registered with the web and pouches, respectively. Registration between the components of the sealing and pouch filling sections is not required, and therefore the entire machine 10 may be brought into registration with the web 14 more quickly and with minimal wasted web material.

In the preferred embodiment, leading and trailing variable speed motors 120, 122 operate the leading and trailing chain sets 106, 108. A drive 232 provides a variable signal to the leading motor 120 and is coupled to the system controller 15 (FIG. 3). The trailing motor is similarly controlled. The leading and trailing motors 120, 122 operate the leading and trailing chain sets 106, 108 with a phase distance between the two so that the leading and trailing clamps 102, 104 are separated by about a pouch width. The leading and trailing chain servos 120, 122 allow the phase distance to be adjusted to accommodate different size pouches. It will be appreciated that whatever the phase distance, the chains are operated at the same speed so that bags held in the clamp are not stretched or crushed.

In the embodiment illustrated in FIG. 2, the trailing clamp 104 is moveable to allow the top of the pouch to be opened and closed. The trailing clamp 104 comprises supports 126 which are connected to the trailing chain set 108, preferably comprising a pair of chains. A pair of support arms 128 are attached to the supports. A clamp holder 130 is slideably mounted on the support arms 128 for movement between closed and open pouch positions. In the closed pouch position, as best shown by the left-hand pouch illustrated in FIG. 2, the clamp holder 130 is positioned near the upstream extent of the support arms 128. The clamp holder 130 is slidable on the support arms 128 to an open pouch position as best shown by the trailing clamp 104 located below the pouch filter 110 in FIG. 2. In the open pouch position, the clamp holder 130 is positioned midway along the support arms 128 so that the clamp holder 130 is relatively closer to the trailing clamp 104. It will be appreciated that in a pouch 12 held by clamps in the open position, the side walls of the pouch 12 expand outwardly away from one another to allow access to the interior of the pouch.

In operation, the clamps 102, 104 are in the closed position as the pouches 12 are transferred from the sealing section. Before the pouch reaches the pouch filler 110, the clamp holder 130 is moved to the open position to facilitate filling of the pouch. The clamp holder 130 remains in the open position as the clamps pass through the pouch filler and the pouches are filled with product. After exiting the pouch filler 110, the clamp holder 130 is repositioned back toward the closed position to allow the top edge to be sealed.

The clamp holder 130 is repositioned using servo-controlled upstream and downstream mechanisms. As best shown in FIG. 2, the upstream pouch-opening mechanism comprises an advance arm 132 positioned before the pouch filler 110. The advance arm 132 has an initial position in which the arm is located outside of the web path. As the clamp holder 130 passes, the advance arm 132 rotates to engage a rear face of the clamp holder and slide it toward the open pouch position. The advance arm 132 completes a full revolution to return to the initial position. If the upstream mechanism has dual arms, the arms complete a half revolution. The advance arm 132 is driven by a motor 136 phased with the system controller 15 so that the advance arm rotates during each cycle.

The downstream pouch closing mechanism preferably comprises a retard arm 134 controlled similar to the advance arm 132. The retard arm 134 extends into the path of the passing clamp holder 130 to impede further advancement of the clamp holder 130. Once the clamp holder 130 reaches the closed position, the retard arm 134 is rotated out of the path to allow the clamp holder 130 to pass. The retard arm 134 executes a full revolution to return to the initial position to await the next clamp holder 130. Rotation of the retard arm 134 is controlled by a retard servomotor 140 The retard servomotor 140 is controlled by the system controller 15 so that operation of the retard arm 134 is phased with the system. Accordingly, the retard servomotor 140 is actuated so that it dwells for a portion of each cycle before rotating. During the dwell, the retard arm 134 engages and pushes the clamp holder 130 toward the open pouch position. The downstream mechanism may have two arms spaced by 180 degrees. for such an embodiment, the arms rotate one-half revolution during each cycle.

As noted above, the filled and closed pouches 12 are then passed between radiant heater bars 112 and top seal rolls 114 to seal the upper edge of the pouches. The pouches may further pass through cool rolls 116 to set the upper seal before being discharged. The top seal rolls 114 and cool rolls 116 are driven by variable speed motors connected to the system controller 15.

It will be appreciated that the above-described pouch making apparatus may be provided as separate modules. As best shown in FIG. 3, the machine comprises a supply module 200 for folding the web and supplying it to downstream apparatus. In the illustrated embodiment, the supply module 200 comprises the plow 24 and the infeed rolls 30. The infeed rolls 30 are coupled to the variable speed motor 70 which receives a drive signal from a drive 208. The drive 208 is coupled to the system controller 15. The infeed rolls 30 pull the web 14 of planar material over the plow 24 to thereby fold the material into mating first and second sides. The controller 15 controls the speed of the infeed rolls 30 to thereby provide a controlled web speed at an outlet of the supply module 200. In a preferred embodiment, a speed sensor is provided for monitoring speed of the infeed rolls 30 to thereby allow the system controller 15 to adjust the speed as necessary.

In addition, the supply module 200 preferably includes the infeed sensor 68. The infeed sensor 68 is coupled to the system controller 15 and senses the registration marks 62 on the web. The infeed sensor 68 allows the controller 15 to feed web material through the infeed rolls 30 to a predetermined point downstream of the infeed rolls. The infeed sensor 68 also may be used to determine actual speed of the web by measuring the amount of time elapsing between registration signals. As a result, the infeed sensor 68 may be used by the system controller 15 to further adjust speed of the infeed roll motor 206.

In a most preferred embodiment, the supply module 200 includes the reel 18 for unwinding the roll of material. The variable speed motor 20 is connected to the reel and receives a drive signal from drive 212. The drive is coupled to the system controller 15 so that reel motor speed may be adjusted. The supply module 200 may further incorporate the accumulator 76 and associated buffer strength feedback, as described in greater detail above, to further adjust speed of the reel motor 210.

Upon exiting the supply module 200, the web next passes through a sealing module 202. As illustrated in FIG. 3, the sealing module 202 incorporates a pair of drive rolls 44 for pulling the web 14 from the outlet of the supply module 200. Drive 214 drives the motor 45 coupled to the drive rolls 44.

The drive 214 is further coupled to the system controller 15. Upstream of the drive rolls 44 are the bottom and side seal stations 32, 38. As noted above, the seal stations are adjustable in the longitudinal direction and carry seal bars to form seals between the first and second sides of the web at spaced locations. The sealing module may include additional seal or other stations, as described above. For sake of clarity, however, FIG. 3 illustrates only the bottom and side seal stations. A cutter 46 is located downstream of the drive rolls 44 for cutting the seals formed by the seal station 38, thereby separating pouches from the web. The sealing module 202 therefore pulls the web from the upstream supply module 200, forms seals therein, and separates formed pouches from the web for downstream pouch operations.

In the preferred embodiment, the bottom and side seal stations 32, 38 comprise moveable carriages 56, 58 which provide for longitudinal movement along the web. The carriages 56 of the bottom seal station 32 have variable speed motors 57 connected thereto. Drives 219, 220 are connected to the system controller 15 and drive the motors 57 at the desired speed. The sensor 60 senses the registration marks 62 on the web 14 and delivers a position signal to the controller 15. The controller adjusts position of the carriages 56 according to the position signal to thereby register the seal bars with the web The side seal station 38 similarly has the variable speed motors 59 connected to the carriages 58 having associated drives 216, 218 coupled to the system controller 15. The sensor 63 senses the registration marks 62 and delivers a location signal to the controller 15. The controller 15 adjusts positions of the carriages 58 according to the location signal to thereby register the seal bars with the web.

In the illustrated embodiment, the seal bars of the bottom and side seal stations 32, 38 are actuated by a single reciprocating motor 33. The motor 33 has a drive 221 coupled to the system controller 15. As a result, the controller 15 controls reciprocation of the seal bars. It will be appreciated, however, that the seal stations 32, 38 may have separate reciprocating motors in accordance with the present invention.

In the preferred embodiment, the cutter 46 comprises a pair of cutter rolls having the variable speed motor 64 connected thereto. The motor 64 has a drive 224 coupled to the system controller 15 for controlling operation of the cutter 46. The cutter sensor 66 is positioned upstream of the cutter rolls for sensing the registration marks 62 on the web 14. The controller 15 is responsive to signals sent by the sensor 68 to thereby trigger the cutter rolls to cut the web. It will be appreciated, therefore, that the registration-related sealing and cutting operations are performed with independent registration and therefore do not rely upon timing with web speed.

Pouches formed in the sealing module 202 are transferred to a filling module 204 for filling, sealing, and removal for distribution. The filling module 204 has at least the leading endless carrier 106 carrying a plurality of clamp pairs. The leading carrier motor 120 is connected to the endless carrier 106 and has the associated drive 232. The drive 232 is coupled to the system controller 15 for adjusting the speed of the endless carrier 106. The filling module 204 further includes a transfer device 54 for transferring the pouches from the cutter 46 to the clamp pairs. The transfer motor 118 is drivingly connected to the transfer device 54 and has an associated drive 236 connected to the system controller 15 (FIG. 3). The clamps are repositioned to open the pouch for filling and close the pouch for sealing after filling, as described in greater detail above and as illustrated in FIG. 2.

According to the illustrated embodiment, a mechanism located upstream of the pouch filler opens the pouches while a separate mechanism located downstream of the filler closes the pouches. The pouches are then carried through a mechanism for forming a top seal, such as the radiant heater bars 112 illustrated in FIG. 2. The upper seal roller 114 then forms the seal and a pair of cool rolls 116 set the seal. The controller 15 adjusts the speed of the transfer device 54 and endless carrier 226 so that the pouches are transferred from the cutter to the clamps.

In the preferred embodiment, the filling module 204 comprises speed sensors on the endless carrier and transfer mechanism to thereby provide feedback for adjusting the actual speed of those devices. In addition, as noted above, the transfer device 54 preferably comprises a vacuum belt. It will further be appreciated that the pairs of clamps may be mounted on separate endless carriers to thereby adapt the clamps for pouches of various sizes, as described in greater detail above.

The present invention not only provides modules which may be used in a line to provide a complete pouch forming machine, but also modules which may be individually operated and tested. With regard to the supply module 200, speed of the infeed rolls 30 is controlled, preferably using the infeed sensor 68, to provide a registered web of material to the downstream apparatus. The supply module 200 provides the drive 208 for operating the motor 206, so that an outside controller may be used to run the module. The web 14 supplied at an output of the supply module 200 may be inspected to verify that the rolls are operating at the proper speed and advancing the proper distance.

The sealing module 202 may similarly be independently operated. The web 14 may be fed through the drive rolls 44 and the formed pouches may be collected at the output of the module. As the web is pulled through the sealing module 202, the seal stations and cutter independently register with the web to form the pouches. The module 202 includes the drive roll, cutter, and carriage drives 214, 224, 216, 218, 220, and 221 to allow a separate controller to operate the module. Furthermore, the sealing module 202 preferably includes the sensors 60, 63 which are adapted for connection to the separate controller to properly control the carriages 56, 58.

The filling module 204 may similarly be tested independently. The transfer device 54 and endless carriers 106, 108 are driven so that pouches fed into the transfer device are carried to the clamps. The filling module 204 provides the endless carrier and transfer device drives 232, 233, 236 which allow a separate controller to adjust their respective speeds. As a result, the present invention provides a truly modular apparatus in which the separate modules may be individually operated or combined to provide a complete pouch forming apparatus. In the preferred embodiment, the filling module 204 further includes speed sensors on the carrier and transfer device motors 120, 122, 118 to provide feedback information to the separate controller.

In light of the above, it will be appreciated that the present invention provides a new and improved packaging machine for forming pouches from a web of material. Web tension is controlled throughout the machine to allow weak web materials to be run. More specifically, the machine uses a pair of infeed rolls to pull the web through an infeed section while the drive rolls pull the web through the sealing section. The speed of the infeed and drive rolls is controlled to maintain a positive draw rate through the sealing section. The infeed section further has an unwind reel having a variable speed motor connected thereto. The unwind reel motor responds to downstream web demand to thereby minimize tension spikes through the infeed section. The power driven unwind reel further minimizes the amount of festoon needed in the infeed section. The present invention further provides a packaging machine having modular sections. Registration-related operations through each module are independently controlled so that the modules need only interface to coordinate input and/or output speeds. As a result, the modules may be separately operated for testing or other purposes, or combined to provide a complete pouch forming machine.

What is claimed is:

1. Apparatus for forming pouches from a continuous web of sealable material provided as a roll, the web traveling along a predetermined path, the apparatus comprising
    an unwind section having an unwind reel for supporting the roll and a variable speed unwind motor drivingly connected to the unwind reel;
    a sealing section drawing the web from the unwind section;
    an accumulating section between the unwind reel and the sealing section for storing a buffer of web material, the accumulating section including a buffer monitor measuring the size of the buffer;
    a controller for controlling speed of the unwind motor, the controller increasing the unwind motor speed as the buffer size decreases and decreasing the unwind motor speed as the buffer size increased.

2. The pouch forming apparatus of claim 1, wherein the speed of the unwind motor is controlled to supply the web at an average velocity corresponding to downstream demand.

3. The pouch forming apparatus of claim 1, wherein the sealing section draws the web from the unwind section in intermittent increments, and wherein the buffer monitor performs a controlled cycle in which the unwind motor speed is increased and decreased for each intermittent increment of web by the sealing section.

4. The pouch forming apparatus of claim 1, wherein the sealing section continuously draws the web from the unwind section at the average velocity, and wherein the controller drives the unwind motor at approximately the average velocity.

5. The pouch forming apparatus of claim 4, wherein the buffer size remains substantially constant and the controller drives the unwind motor at a substantially constant speed.

6. The pouch forming apparatus of claim 1, wherein the accumulating section includes a plurality of rollers between the unwind reel and the sealing section positioned in a pattern to form a web festoon, at least one of the rollers being mounted for translation to allow a buffer length of web to be accumulated in or played out from the festoon.

7. The pouch forming apparatus of claim 6, wherein the position of the at least one roller mounted for translation indicates downstream demand.

8. The pouch forming apparatus of claim 6, wherein the buffer monitor detects the position of the at least one roller mounted for translation.

9. The pouch forming apparatus of claim 6, wherein the at least one roller mounted for translation is mounted on a pivot arm, the pivot arm connected to a cylinder providing a known resistive force, the position of the cylinder indicating buffer size.

10. The pouch forming apparatus of claim 1, further comprising a pair of feed rolls positioned on the web path to controllable draw the web from the unwind reel, a variable speed feed motor drivingly connected to the feed rolls.

11. The pouch forming apparatus of claim 10, wherein the feed rolls are located downstream of the sealing section.

12. The pouch forming apparatus of claim 10, wherein the feed rolls are located upstream of the sealing section.

13. The pouch forming apparatus of claim 1, further comprising a pair of infeed rolls upstream of the sealing section and a pair of drive rolls downstream of the sealing section for drawing the web form the unwind section, the infeed rolls having a variable speed infeed motor drivingly connected thereto, the drive rolls having a variable speed drive roll motor drivingly connected thereto, the controller controlling the speed of the infeed and drive roll motors.

14. The pouch forming apparatus of claim 13, wherein the controller controls the speed of the infeed motor and the drive roll motor to produce a predetermined positive draw rate of the web through the sealing section thereby to control web tension therethrough.

15. Apparatus for forming pouches from a continuous web of sealable material provided as a roll, the web traveling along a predetermined path, the apparatus comprising
    a unwind section having an unwind reel for supporting the roll and a variable speed unwind motor drivingly connected to the unwind reel;
    a sealing section drawing the web from the unwind section;
    an accumulating section between the unwind reel and the sealing section for storing a buffer of web material, the accumulating section including a support arm supporting first and second rollers adjacent opposing ends of the support arm, the support arm being pivotally mounted about a point between the first and second rollers; and
    the accumulating section further including a third roller fixed in position above the first roller, and a fourth roller fixed in position below the second roller, rotation of the support arm adjusting the position of the first and second rollers relative to the third and fourth rollers to adjust buffer size a controller for controlling speed of the unwind motor, the controller increasing the unwind motor speed as the buffer size decreases and decreasing the unwind motor speed as the buffer size increases.

* * * * *